United States Patent
Chi et al.

(10) Patent No.: US 11,214,272 B2
(45) Date of Patent: Jan. 4, 2022

(54) AUTONOMOUS VEHICLE SYSTEM FOR DETERMINING A PULLOVER SPOT IN RESPONSE TO DETECTED LOCAL FAILURE

(71) Applicant: Waymo LLC, Mountain View, CA (US)

(72) Inventors: Emily Chi, Los Angeles, CA (US); Ryan Joseph Andrade, Morgan Hill, CA (US)

(73) Assignee: Waymo LLC, Mountain View, CA (US)

( * ) Notice: Subject to any disclaimer, the term of this patent is extended or adjusted under 35 U.S.C. 154(b) by 114 days.

(21) Appl. No.: 16/139,538

(22) Filed: Sep. 24, 2018

(65) Prior Publication Data
US 2020/0094850 A1   Mar. 26, 2020

(51) Int. Cl.
*B60W 50/029* (2012.01)
*G05D 1/00* (2006.01)
(Continued)

(52) U.S. Cl.
CPC ...... *B60W 50/029* (2013.01); *B60W 60/0024* (2020.02); *B60W 60/00253* (2020.02);
(Continued)

(58) Field of Classification Search
CPC .. G01C 21/3423; G01C 21/00; G05D 1/0088; G05D 1/0055–0072; G05D 2201/0213;
(Continued)

(56) References Cited

U.S. PATENT DOCUMENTS 9,293,048 B2   3/2016   Fowler
9,523,984 B1   12/2016  Herbach et al.
(Continued)

FOREIGN PATENT DOCUMENTS

CN      102233877 A      11/2011
DE   102014218002 A1 *  3/2016   ............. G08G 1/143

OTHER PUBLICATIONS

Remy Ronald—English translation of DE-102014218002-A1 via Espacenet Patent Translate, retrieved Sep. 2, 2021. (Year: 2021).*
(Continued)

*Primary Examiner* — Jeffrey C Boomer
*Assistant Examiner* — Paul Allen
(74) *Attorney, Agent, or Firm* — Botos Churchill IP Law

(57) ABSTRACT

The disclosure provides for a method for determining a pullover spot for a vehicle. The method includes using a computing device to detect information related to a system of the vehicle or an environment surrounding the vehicle using a sensor of a vehicle and determine a local failure of the vehicle based on the information. The computing device may then be used to determine that the vehicle should pullover before completing a current trip related to transporting a passenger or good by comparing vehicle requirements for the trip with the local failure and determine a pullover spot by identifying a first area for the vehicle to park in part based on a second area being available for a second vehicle to pick up the passenger or good. The computing device may operate the vehicle to the pullover spot and transmit a request for a second vehicle.

20 Claims, 5 Drawing Sheets

(51) Int. Cl.
G08G 1/00 (2006.01)
B60W 60/00 (2020.01)

(52) U.S. Cl.
CPC ..... B60W 60/00256 (2020.02); G05D 1/0072 (2013.01); G05D 1/0088 (2013.01); G08G 1/202 (2013.01); B60W 2050/0292 (2013.01); G05D 2201/0213 (2013.01)

(58) Field of Classification Search
CPC .............. G05D 1/00; B60W 30/181; B60W 50/029–2050/0297; B60W 60/00256; B60W 60/0024; B60W 60/00253; B60W 2050/0292; B60W 60/00; B60W 2050/029; G08G 1/20–207; G08G 1/202; G08G 1/00; G06Q 50/28–50/30; G07C 5/00; B65G 63/00; B65G 67/00; B65G 69/00
USPC ...................... 701/23–28, 300–302
See application file for complete search history.

(56) References Cited

U.S. PATENT DOCUMENTS

| | | | |
|---|---|---|---|
| 9,551,992 B1* | 1/2017 | Barton-Sweeney | ... G08G 1/202 |
| 9,631,933 B1 | 4/2017 | Aula et al. | |
| 10,303,171 B1* | 5/2019 | Brady | ............ G08G 1/207 |
| 2002/0099574 A1* | 7/2002 | Cahill | ............ G08G 1/148 |
| | | | 705/5 |
| 2012/0078509 A1 | 3/2012 | Choi | |
| 2015/0142244 A1 | 5/2015 | You et al. | |
| 2015/0269521 A1* | 9/2015 | Knapp | ......... G06Q 10/08355 |
| | | | 705/338 |
| 2017/0011631 A1* | 1/2017 | Nordbruch | ......... B62D 15/0285 |
| 2017/0045885 A1 | 2/2017 | Okumura et al. | |
| 2018/0025635 A1* | 1/2018 | Cheaz | .............. G05D 1/0297 |
| | | | 701/23 |
| 2018/0046182 A1* | 2/2018 | Joyce | ............... B60W 50/0225 |
| 2018/0052463 A1 | 2/2018 | Mays | |
| 2018/0164813 A1 | 6/2018 | Poeppel et al. | |
| 2018/0281817 A1* | 10/2018 | Ravichandran | ........ B60K 37/06 |
| 2018/0299884 A1* | 10/2018 | Morita | ................ G07C 5/0816 |
| 2018/0349825 A1* | 12/2018 | Yamamoto | ....... G06Q 10/06314 |
| 2018/0357901 A1* | 12/2018 | Beaurepaire | .......... B60W 40/00 |
| 2019/0122561 A1* | 4/2019 | Shimizu | ................ G08G 1/202 |
| 2019/0124165 A1* | 4/2019 | Bundick | ............. H04W 68/005 |
| 2019/0197497 A1* | 6/2019 | Abari | .................... G06Q 10/20 |
| 2019/0197904 A1* | 6/2019 | Muta | ...................... H04W 4/44 |
| 2019/0204097 A1* | 7/2019 | Starns | ................. G07C 5/0808 |
| 2019/0212157 A1* | 7/2019 | Wu | ....................... H04W 4/029 |
| 2019/0235499 A1* | 8/2019 | Kazemi | ................ G05D 1/0088 |
| 2019/0250002 A1* | 8/2019 | Zhao | ....................... B60W 50/14 |
| 2019/0300007 A1* | 10/2019 | Hilligardt | ......... B60W 50/0205 |
| 2019/0383622 A1* | 12/2019 | Aich | .................. G01C 21/3661 |
| 2020/0027354 A1* | 1/2020 | Goldman | ............ G05D 1/0297 |
| 2020/0051021 A1* | 2/2020 | Ohtani | ............. G06Q 10/08355 |
| 2020/0081433 A1* | 3/2020 | Sun | ........................ G06Q 10/00 |

OTHER PUBLICATIONS

International Search Report and Written Opinion for Application No. PCT/US2019/051659 dated Jan. 6, 2019.

* cited by examiner

AUTONOMOUS VEHICLE SYSTEM FOR DETERMINING A PULLOVER SPOT IN RESPONSE TO DETECTED LOCAL FAILURE

BACKGROUND

Autonomous vehicles, such as vehicles that do not require a human driver, can be used to aid in the transport of passengers or items from one location to another. Such vehicles may operate in a fully autonomous mode where passengers may provide some initial input, such as a pick up or destination location, and a vehicle maneuvers itself to that location.

BRIEF SUMMARY

Aspects of the disclosure provide for a method for determining a pullover spot for a vehicle. The method includes using one or more computing devices to detect information related to one or more systems of the vehicle or an environment surrounding the vehicle using one or more sensors of the vehicle and determine a local failure at the vehicle based on the information from the one or more sensors. The method also includes using the one or more computing devices to determine that the vehicle should pullover before completing a current trip related to transporting one or both of a passenger or good by comparing vehicle requirements for the trip with the local failure and determine a pullover spot by identifying a first area for the vehicle to park in part based on a second area being available for a second vehicle to pick up the one or both of the passenger or good. The method further includes using the one or more computing devices to operate the vehicle to park in the pullover spot and transmit a request for a second vehicle based on the pullover spot.

In one example, determining the local failure includes comparing the information with one or more set thresholds. In another example, determining, by the one or more computing devices, the vehicle requirements based on characteristics of roadways for the trip and planned maneuvers for the vehicle during the trip. In a further example, determining the pullover spot includes determining that the first area is within a maximum distance from a current location and that the first area is a minimum size based on a size of the vehicle. In yet another example, determining the pullover spot includes determining that the first area is reachable within a maximum amount of time from when the local failure is detected based on the local failure and that the first area is a minimum size based on a size of the vehicle. In a still further example, determining the pullover spot includes determining that the first area is next to a passenger disembarking area that is within a maximum distance from a road.

In another example, determining the pullover spot includes determining that the first area is next to a passenger disembarking area that is within a maximum distance from the second area. In yet another example, determining the pullover spot includes determining that the second area is a minimum size based on a size of the second vehicle. In a further example, determining the pullover spot include determining that a wait time for the second vehicle exceeds a maximum wait time threshold and determining that the second area is within a maximum distance from one or more facilities for the one or both of the passenger or the good. In a still further example, transmitting the request for the second vehicle includes transmitting information related to the second area.

Other aspects of the disclosure provide for a fleet management system comprising one or more processors. The one or more processors are configured to receive updates regarding a status of a plurality of vehicles capable of autonomously driving, receive a first update related to a local failure of a first vehicle of the plurality of vehicles, and determine that the vehicle should pullover before completing a current trip related to transporting a passenger or good by comparing needed vehicle functions for the trip with the local failure. The one or more processors are also configured to determine a pullover spot by identifying a first area for the vehicle to park based on a second area being available for a second vehicle to pick up the passenger or good, transmit instructions to the first vehicle to park in the pullover spot, and transmit instructions to a second vehicle of the plurality of vehicles based on the pullover spot and a status of the second vehicle.

In one example, the one or more processors are configured to determine the pullover spot by determining that the first area is within a maximum distance from a current location based on the local failure and that the first area is a minimum size based on a size of the vehicle. In another example, the one or more processors are configured to determine the pullover spot by determining that the first area is reachable within a maximum amount of time from when the local failure is detected based on the local failure and that the first area is a minimum size based on a size of the vehicle. In yet another example, the one or more processors are configured to determine the pullover spot by determining that the first area is next to a passenger disembarking area that is within a maximum distance from a road. In a still further example, the one or more processors are configured to determine the pullover spot by determining that the first area is next to a passenger disembarking area that is within a maximum distance from the second area.

In another example, the one or more processors are configured to determine the pullover spot by determining that the second area is a minimum size based on a size of the second vehicle. In yet another example, the one or more processors are configured to determine the pullover spot by determining that a wait time for the second vehicle exceeds a maximum wait time threshold and determining that the second area is within a maximum distance from one or more facilities for the one or both of the passenger or the good. In a further example, the one or more processors are configured to transmit the instructions to the second vehicle by transmitting information related to the second area. In a still further example, the one or more processors are further configured to select the second vehicle based on a location of the second vehicle and an availability of the second vehicle.

Further aspects of the disclosure provide for a vehicle capable of operating autonomously. The vehicle includes one or more sensors configured to detect a status of one or more systems of the vehicle or an environment surrounding the vehicle and one or more computing devices. The one or more computing devices are configured to receive information from the one or more sensors and determine a local failure at the vehicle based on the information from the one or more sensors. The one or more computing devices are also configured to determine that the vehicle should pullover before completing a current trip related to transporting one or both of a passenger or good by comparing vehicle requirements for the trip with the local failure and determine a pullover spot by identifying a first area for the vehicle to park in part based on a second area being available for a second vehicle to pick up the one or both of the passenger or good. The one or more computing devices then is configured to operate the vehicle to park in the pullover spot.

DETAILED DESCRIPTION

Overview

Figure 1:
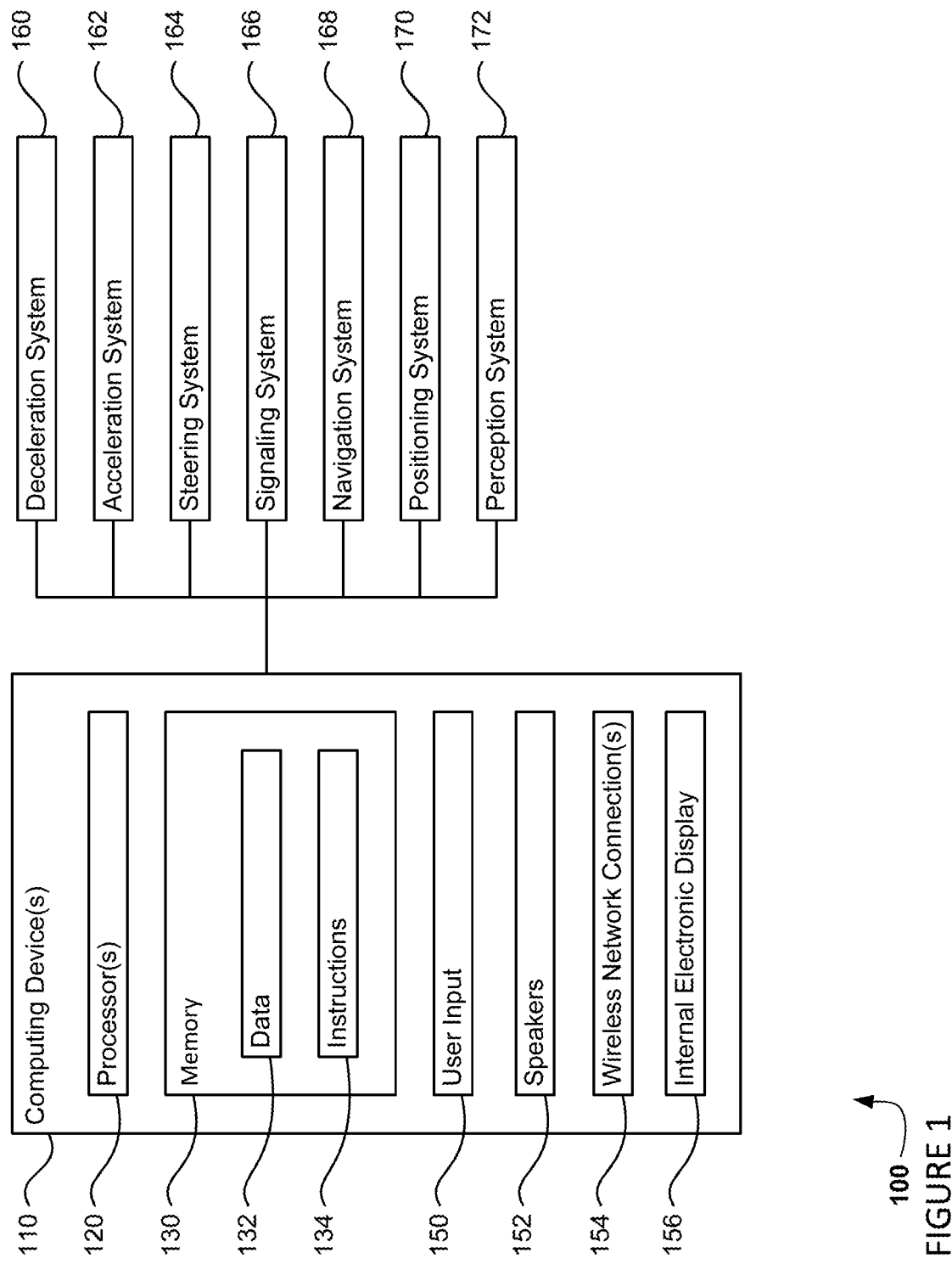
FIG. 1 is a functional diagram of an example vehicle 100 in accordance with aspects of the disclosure.

The technology relates to systems and methods for addressing faults in autonomous or semi-autonomous vehicles. This is an important function for such vehicles, especially when the vehicles are transporting passengers or cargo when the fault occurs. For instance, computing devices of a vehicle may detect a local failure of the vehicle while transporting a passenger or good. The vehicle's computing devices may determine that the vehicle should stop before completing the trip and may determine a pullover spot. The pullover spot may be determined based on at least an area for a passenger to disembark and/or a good to be unloaded from the vehicle and an area for a second vehicle to pick up the disembarked passenger or an unloaded good. The vehicle's computing devices may park the vehicle in the pullover spot and may also request a pickup of the passenger or good by another vehicle.

Detecting a local failure at a vehicle may include receiving information from one or more detection systems. For some information, the vehicle's computing devices may compare the received information with one or more set thresholds. When the one or more set thresholds are not met, the vehicle's computing devices may determine that a local failure has occurred. For other information, the vehicle's computing devices may determine that a local failure has occurred due to the receipt of the information itself rather than other criteria. Furthermore, a lack of information may also be an indication of a local failure.

The vehicle's computing devices may determine that the vehicle should stop before completing a current trip related to transporting a passenger or good by comparing needed vehicle functions, or vehicle requirements, for the trip with the detected local failure. A mid-trip stop may be required when the detected local failure corresponds with one of the vehicle requirements for the trip. Some local failures may trigger a more immediate pullover action or other action, in which case the more immediate action may be taken automatically without further processing.

A pullover spot may be determined based on at least a first area for the vehicle to park and a second area for a second vehicle to pick up a disembarked passenger or unloaded good. For example, a location may be determined to be the pullover spot when it has a first area for the vehicle to park adjacent to or within an accessible distance from a second area where the second vehicle may park. In addition, the identified areas may be determined to satisfy certain requirements, such as distance requirements or size requirements.

The vehicle's computing devices may operate the vehicle to park in the pullover spot and may also request pick up of the passenger or good. When received at a fleet management system, the fleet management system may select the second vehicle from a plurality of vehicles based on a location of the second vehicle and an availability of the second vehicle. The vehicle's computing devices may then determine whether a passenger or good has been transferred to the second vehicle. After the transfer is determined, the vehicle's computing devices may then operate the original vehicle to a fallback location based on the local failure.

The features described herein may provide for a vehicle that reacts quickly and efficiently to a local failure by finding a pullover spot that is both safe for a passenger to disembark and accessible by a second vehicle. Determining a pullover spot and requesting a second vehicle may also allow for a trip to be quickly continued after it is interrupted by the local failure. In addition, the feature described also allows for the vehicle to continue the trip may when the local failure does not affect the operation of the vehicle for the trip, thereby preventing unnecessary interruption of trips.

Example Systems

As shown in FIG. 1, a vehicle 100 in accordance with one aspect of the disclosure includes various components. While certain aspects of the disclosure are particularly useful in connection with specific types of vehicles, the vehicle 100 may be any type of vehicle including, but not limited to, cars, trucks, motorcycles, busses, boats, airplanes, helicopters, lawnmowers, recreational vehicles, amusement park vehicles, farm equipment, construction equipment, trams, golf carts, trains, and trolleys. The vehicle 100 may have one or more computing devices 110 that include one or more processors 120, memory 130 and other components typically present in general purpose computing devices.

The memory 130 stores information accessible by the one or more processors 120, including data 132 and instructions 134 that may be executed or otherwise used by the processor(s) 120. The memory 130 may be of any type capable of storing information accessible by the processor(s), including a computing device-readable medium, or other medium that stores data that may be read with the aid of an electronic device, such as a hard-drive, memory card, ROM, RAM, DVD or other optical disks, as well as other write-capable and read-only memories. Systems and methods may include different combinations of the foregoing, whereby different portions of the instructions and data are stored on different types of media.

The data 132 may be retrieved, stored or modified by processor(s) 120 in accordance with the instructions 134. For instance, although the claimed subject matter is not limited by any particular data structure, the data may be stored in computing device registers, in a relational database as a table having a plurality of different fields and records, XML documents or flat files. The data may also be formatted in any computing device-readable format.

The instructions 134 may be any set of instructions to be executed directly (such as machine code) or indirectly (such as scripts) by the processor. For example, the instructions may be stored as computing device code on the computing device-readable medium. In that regard, the terms "instructions" and "programs" may be used interchangeably herein. The instructions may be stored in object code format for direct processing by the processor, or in any other computing device language including scripts or collections of independent source code modules that are interpreted on demand or compiled in advance. Functions, methods and routines of the instructions are explained in more detail below.

The one or more processors 120 may be any conventional processors, such as commercially available CPUs. Alternatively, the one or more processors may be a dedicated device such as an ASIC or other hardware-based processor, such as a field programmable gate array (FPGA). Although FIG. 1 functionally illustrates the processor(s), memory, and other elements of the vehicle's computing devices 110 as being within the same block, it will be understood by those of ordinary skill in the art that the processor, computing device, or memory may actually include multiple processors, computing devices, or memories that may or may not be stored within the same physical housing. For example, memory may be a hard drive or other storage media located in a housing different from that of the vehicle's computing devices 110. Accordingly, references to a processor or computing device will be understood to include references to a collection of processors or computing devices or memories that may or may not operate in parallel.

The vehicle's computing devices 110 may have all of the components normally used in connection with a computing device such as the processor and memory described above, as well as a user input 150 (e.g., a mouse, keyboard, touch screen and/or microphone), various electronic displays (e.g., a monitor having a screen, a small LCD touch-screen or any other electrical device that is operable to display information), audio output (such as speakers 152), and a wireless network connection 154. In this example, the vehicle 100 includes an internal electronic display 156. In this regard, internal electronic display 156 may be located within a cabin of vehicle 100 and may be used by the vehicle's computing devices 110 to provide information to passengers within the vehicle 100.

In one example, the vehicle's computing devices 110 may be part of an autonomous driving computing system incorporated into vehicle 100. The autonomous driving computing system may capable of communicating with various components of the vehicle 100 as needed in order to control the vehicle 100 in fully autonomous (without input from a driver) as well as semi-autonomous (some input from a driver) driving modes.

When engaged, the vehicle's computing devices 110 may control some or all of these functions of vehicle 100 and thus be fully or partially autonomous. It will be understood that although various systems and the vehicle's computing devices 110 are shown within vehicle 100, these elements may be external to vehicle 100 or physically separated by large distances. In this regard, the vehicle's computing devices 110 may be in communication various systems of vehicle 100, such as deceleration system 160, acceleration system 162, steering system 164, signaling system 166, navigation system 168, positioning system 170, and perception system 172, such that one or more systems working together may control the movement, speed, direction, etc. of vehicle 100 in accordance with the instructions 134 stored in memory 130. Although these systems are shown as external to the vehicle's computing devices 110, in actuality, these systems may also be incorporated into the vehicle's computing devices 110, again as an autonomous driving computing system for controlling vehicle 100.

As an example, the vehicle's computing devices 110 may interact with deceleration system 160 and acceleration system 162 in order to control the speed of the vehicle 100. Similarly, steering system 164 may be used by the vehicle's computing devices 110 in order to control the direction of vehicle 100. For example, if vehicle 100 configured for use on a road, such as a car or truck, the steering system may include components to control the angle of wheels to turn the vehicle 100. Signaling system 166 may be used by the vehicle's computing devices 110 in order to signal the vehicle's intent to other drivers or vehicles, for example, by lighting turn signals or brake lights when needed.

Navigation system 168 may be used by the vehicle's computing devices 110 in order to determine and follow a route to a location. In this regard, the navigation system 168 and/or data 132 may store map information, e.g., highly detailed maps identifying the shape and elevation of roads, lane lines, intersections, crosswalks, speed limits, traffic signals, buildings, signs, real time traffic information, vegetation, or other such objects and information. Map information may also include information that describes the location of speed limit signs as well as speed limits for sections of road or zones.

Positioning system 170 may be used by the vehicle's computing devices 110 in order to determine the vehicle's relative or absolute position on a map or on the earth. For example, the positioning system 170 may include one or more sensors, such as a GPS receiver to determine the vehicle's latitude, longitude and/or altitude position. Other location detection systems utilizing other sensors, such as laser-based localization systems, inertial-aided GPS, or camera-based localization, may also be used to identify the location of the vehicle 100. The location of the vehicle may include an absolute geographical location, such as latitude, longitude, and altitude as well as relative location information, such as location relative to other cars immediately around it which can often be determined with less noise that absolute geographical location.

The positioning system 170 may also include other detection systems or sensors in communication with the vehicle's computing devices 110, such as an orientation or pose detection system configured to determine the vehicle's pitch, yaw or roll (or changes thereto) relative to the direction of gravity or a plane perpendicular thereto. Other detection systems may track increases or decreases in speed of the vehicle 100 and the direction of such changes. The provision of location and orientation data as set forth herein may be provided automatically by the detection systems to the vehicle's computing devices 110, other computing devices and combinations of the foregoing.

The perception system 172 may include one or more detection systems in communication with the vehicle's computing devices 110 that are configured for detecting and performing analysis on objects external to the vehicle 100 such as other vehicles, obstacles in the road, traffic signals, signs, trees, etc. Sensors of these detection systems may include lasers, sonar units, radar units, cameras, or any other detection devices which record data that may be processed by the vehicle's computing devices 110. This data may describe the shape and geographic location coordinates of objects detected in the vehicle's environment. Other sensor data collected by the detection systems may include, for example, reflectivity, speed, trajectory data, etc. of detected objects.

The vehicle's computing devices 110 may control the direction and speed of the vehicle by controlling various components. By way of example, the vehicle's computing devices 110 may navigate the vehicle to a destination location completely autonomously using data from the detailed map information and navigation system 168. The vehicle's computing devices 110 may use the positioning system 170 to determine the vehicle's location and perception system 172 to detect and respond to objects when needed to reach the location safely. In order to do so, the vehicle's computing devices 110 may cause the vehicle to accelerate (e.g., by increasing fuel or other energy provided to the engine by acceleration system 162), decelerate (e.g., by decreasing the fuel supplied to the engine, changing gears, and/or by applying brakes by deceleration system 160), change direction (e.g., by turning the front or rear wheels of vehicle 100 by steering system 164), and signal such changes (e.g., by lighting turn signals of signaling system 166). Thus, the acceleration system 162 and deceleration system 160 may be a part of a drivetrain that includes various components between an engine of the vehicle and the wheels of the vehicle. Again, by controlling these systems, the vehicle's computing devices 110 may also control the drivetrain of the vehicle in order to maneuver the vehicle autonomously.

Figure 2:
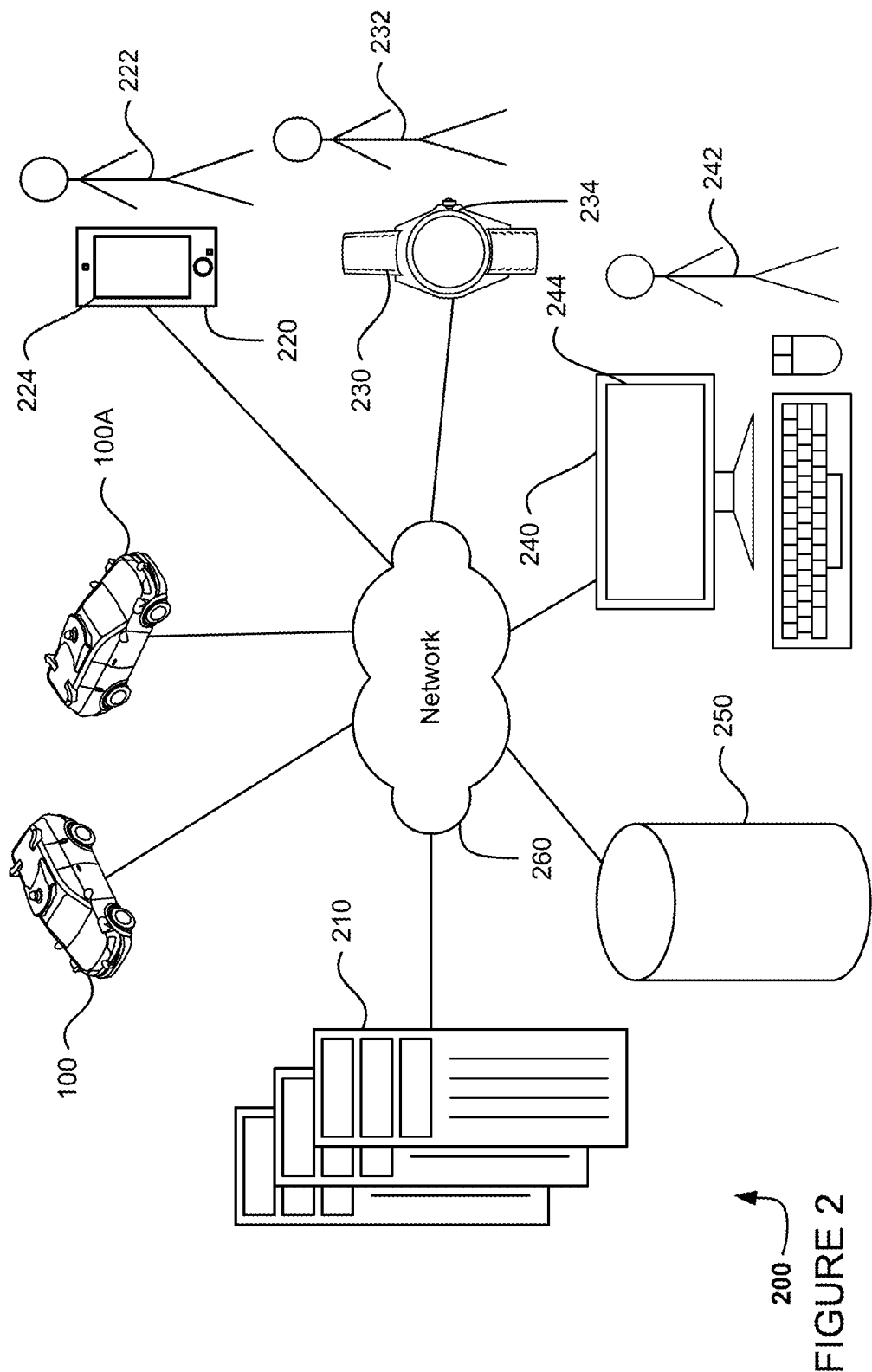
FIG. 2 is a functional diagram of an example system in accordance with an exemplary embodiment.
Figure 3:
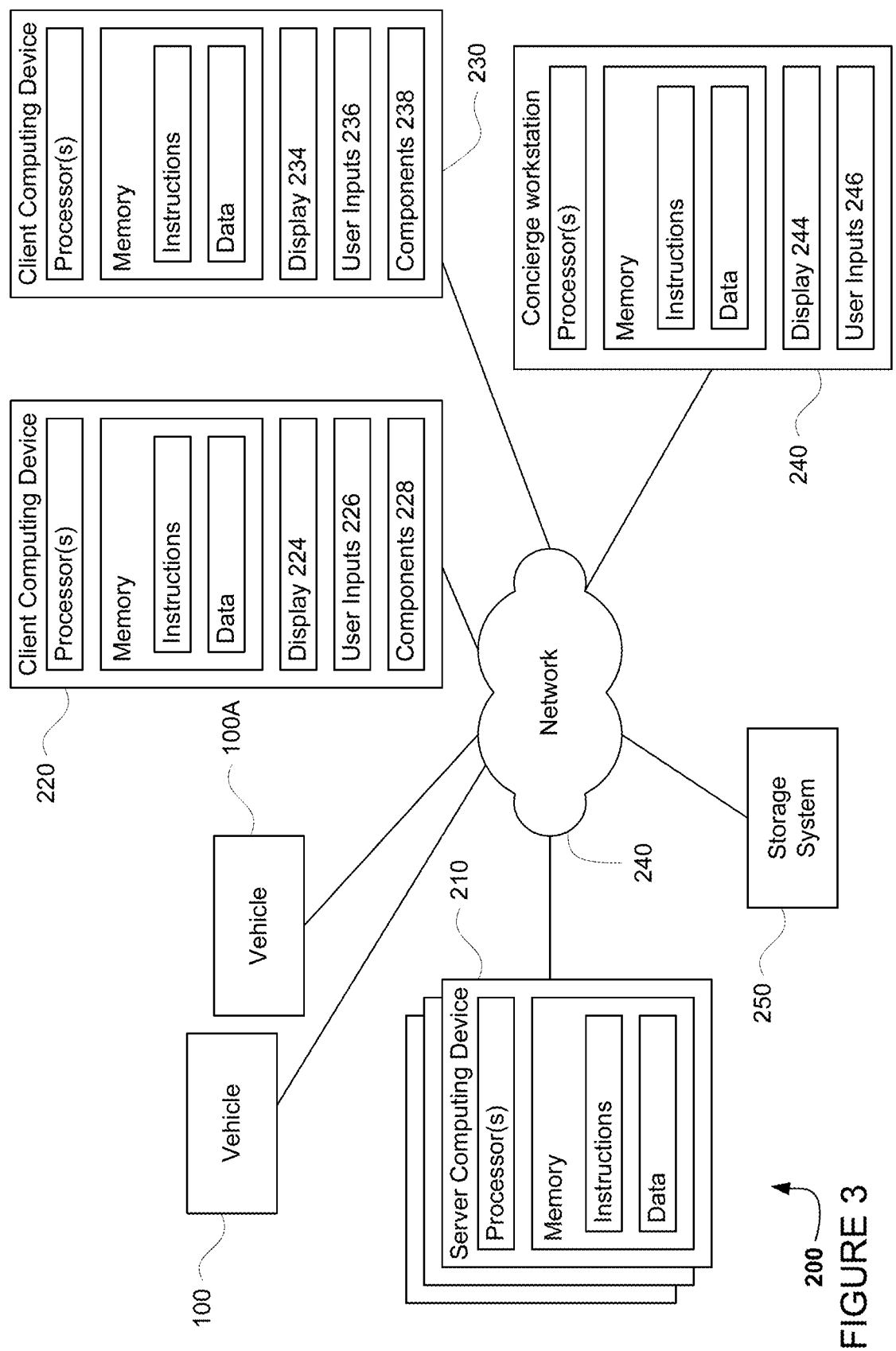
FIG. 3 is a pictorial diagram of the system of FIG. 2 in accordance with aspects of the disclosure.

Computing device 110 of vehicle 100 may also receive or transfer information to and from other computing devices. FIGS. 2 and 3 are pictorial and functional diagrams, respectively, of an example system 200 that includes a plurality of computing devices 210, 220, 230, 240 and a storage system 250 connected via a network 260. System 200 also includes vehicle 100, and vehicle 100A which may be configured similarly to vehicle 100. Although only a few vehicles and computing devices are depicted for simplicity, a typical system may include significantly more.

As shown in FIG. 3, each of computing devices 210, 220, 230, 240 may include one or more processors, memory, data and instructions. Such processors, memories, data and instructions may be configured similarly to one or more processors 120, memory 130, data 132, and instructions 134 of computing device 110.

The network 260, and intervening nodes, may include various configurations and protocols including short range communication protocols such as Bluetooth, Bluetooth LE, the Internet, World Wide Web, intranets, virtual private networks, wide area networks, local networks, private networks using communication protocols proprietary to one or more companies, Ethernet, WiFi and HTTP, and various combinations of the foregoing. Such communication may be facilitated by any device capable of transmitting data to and from other computing devices, such as modems and wireless interfaces.

In one example, one or more computing devices 110 may include a server having a plurality of computing devices, e.g., a load balanced server farm, that exchange information with different nodes of a network for the purpose of receiving, processing and transmitting the data to and from other computing devices. For instance, one or more computing devices 210 may include one or more dispatching server computing devices, or fleet management system, that are capable of communicating with computing device 110 of vehicle 100 or a similar computing device of vehicle 100A as well as computing devices 220, 230, 240 via the network 260. For example, vehicles 100 and 100A may be a part of a fleet of vehicles that can be dispatched by one or more server computing devices to various locations. In this regard, the vehicles of the fleet may periodically send the one or more server computing devices location information provided by the vehicle's respective positioning systems and the one or more server computing devices may track the locations of the vehicles.

In addition, the fleet management system 210 may use network 260 to transmit and present information to a user, such as user 222, 232, 242 on a display, such as displays 224, 234, 244 of computing devices 220, 230, 240. In this regard, computing devices 220, 230, 240 may be considered client computing devices.

As shown in FIG. 3, each client computing device 220, 230, 240 may be a personal computing device intended for use by a user 222, 232, 242, and have all of the components normally used in connection with a personal computing device including a one or more processors (e.g., a central processing unit (CPU)), memory (e.g., RAM and internal hard drives) storing data and instructions, a display such as displays 224, 234, 244 (e.g., a monitor having a screen, a touch-screen, a projector, a television, or other device that is operable to display information), and user input devices 226, 236, 246 (e.g., a mouse, keyboard, touch screen or microphone). The client computing devices may also include a camera for recording video streams, speakers, a network interface device, and all of the components used for connecting these elements to one another.

In addition, the client computing devices 220 and 230 may also include components 228 and 238 for determining the position and orientation of client computing devices. For example, these components may include a GPS receiver to determine the device's latitude, longitude and/or altitude as well as an accelerometer, gyroscope or another direction/speed detection device as described above with regard to positioning system 170 of vehicle 100.

Although the client computing devices 220, 230, and 240 may each comprise a full-sized personal computing device, they may alternatively comprise mobile computing devices capable of wirelessly exchanging data with a server over a network such as the Internet. By way of example only, client computing device 220 may be a mobile phone or a device such as a wireless-enabled PDA, a tablet PC, a wearable computing device or system, or a netbook that is capable of obtaining information via the Internet or other networks. In another example, client computing device 230 may be a wearable computing system, shown as a wristwatch in FIG. 2. As an example the user may input information using a small keyboard, a keypad, microphone, using visual signals with a camera, or a touch screen.

In some examples, client computing device 240 may be a concierge workstation used by an administrator to provide concierge services to users such as users 222 and 232. For example, a concierge 242 may use the concierge workstation 240 to communicate via a telephone call or audio connection with users through their respective client computing devices or vehicles 100 or 100A in order to facilitate the safe operation of vehicles 100 and 100A and the safety of the users as described in further detail below. Although only a single concierge workstation 240 is shown in FIGS. 2 and 3, any number of such work stations may be included in a typical system.

Storage system 250 may store various types of information as described in more detail below. This information may be retrieved or otherwise accessed by one or more server computing devices, such as the fleet management system 210, in order to perform some or all of the features described herein. For example, the information may include routing data for generating and evaluating routes between locations. The routing information may be used to estimate how long it would take a vehicle at a first location to reach a second location. In this regard, the routing information may include map information, not necessarily as particular as the detailed map information described above, but including roads, as well as information about those road such as direction (one way, two way, etc.), orientation (North, South, etc.), speed limits, as well as traffic information identifying expected traffic conditions, etc. The information may also include a task queue, various tasks, and information associated with the tasks. Tasks may be passenger-related tasks, non-passenger tasks, fallback tasks, and the like.

As with memory 130, storage system 250 can be of any type of computerized storage capable of storing information accessible by the fleet management system 210, such as a hard-drive, memory card, ROM, RAM, DVD, CD-ROM, write-capable, and read-only memories. In addition, storage system 250 may include a distributed storage system where data is stored on a plurality of different storage devices which may be physically located at the same or different geographic locations. Storage system 250 may be connected to the computing devices via the network 260 as shown in FIG. 2 and/or may be directly connected to or incorporated into any of the computing devices 110, 210, 220, 230, 240, etc.

Example Methods

In addition to the operations described above and illustrated in the figures, various operations will now be described. It should be understood that the following operations do not have to be performed in the precise order described below. Rather, various steps can be handled in a different order or simultaneously, and steps may also be added or omitted.

Figure 4:
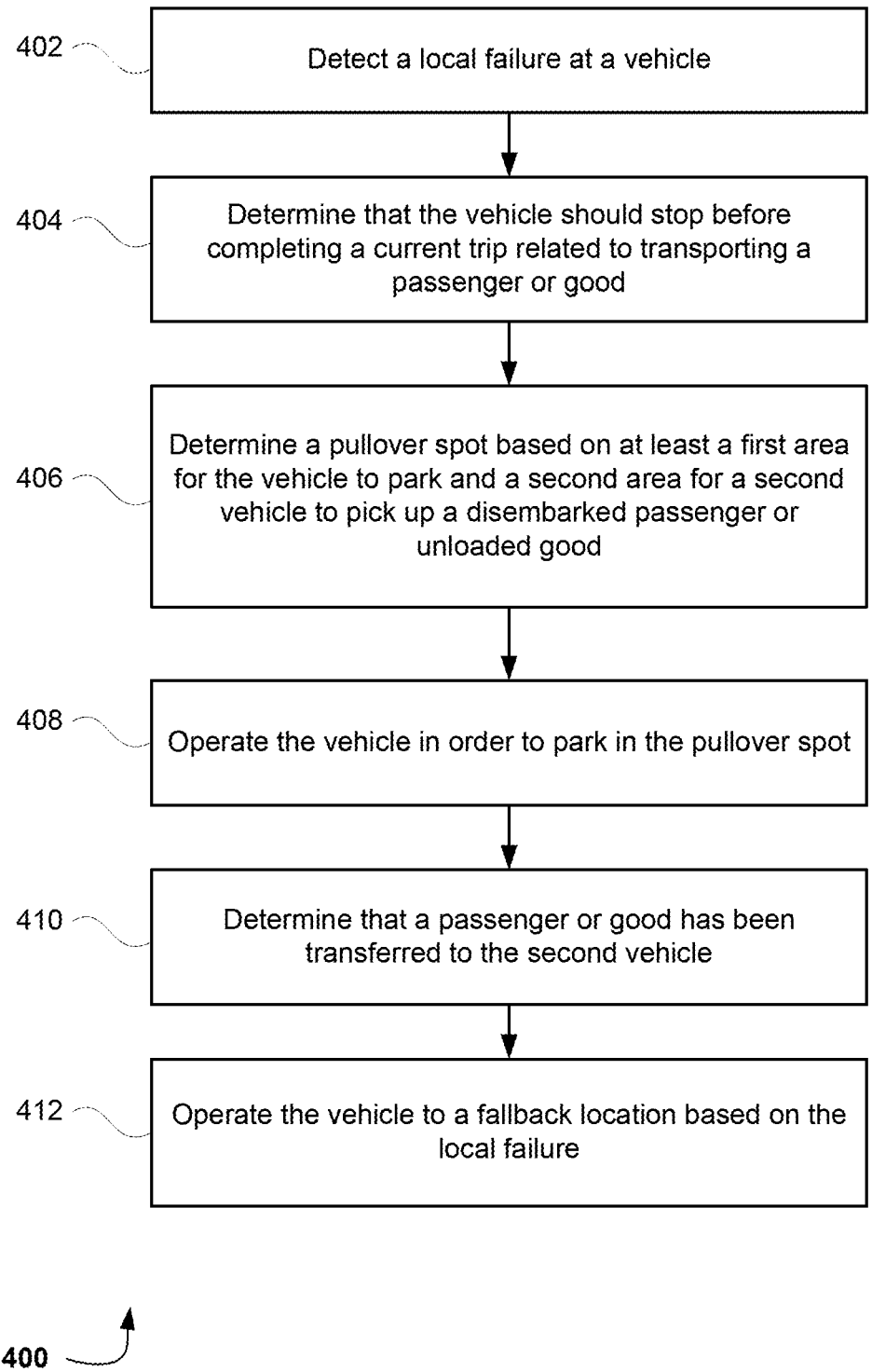
FIG. 4 is an example flow diagram in accordance with aspects of the disclosure.

FIG. 4 is an example flow diagram 400 including a method for determining a pullover spot for a vehicle in accordance with some of the aspects described above. The method may be performed by the one or more computing devices 110 of the vehicle. While FIG. 4 shows blocks in a particular order, the order may be varied and that multiple operations may be performed simultaneously. Also, operations may be added or omitted.

At block 402, the vehicle's computing devices 110 may detect a local failure of the vehicle 100. Detecting a local failure at the vehicle 100 may include receiving information from one or more detection systems of the positioning system 170 or the perception system 172. For some information, the vehicle's computing devices 110 may compare the received information with one or more set thresholds. Additionally or alternatively, for other information, the vehicle's computing devices 110 may determine that a local failure has occurred due to the receipt of the information.

For instance, the vehicle's computing devices 110 may receive measurements, such as an amount of diminished field of view of a sensor of a detection system (e.g., 30% reduction in field of view), an air pressure of a tire (e.g., 25 psi), or an engine temperature (e.g., 250° F.), and may compare the received measurements with thresholds, such as a threshold maximum amount of diminished field of view (e.g., 33% reduction in field of view), a threshold minimum air pressure value (e.g. 30 psi), and a threshold maximum engine temperature value (e.g., 250° F.). When the one or more set thresholds are not met, the vehicle's computing devices 110 may determine that a local failure has occurred. In this example, because the detected air pressure and the detected engine temperature both do not conform to the corresponding thresholds, the vehicle's computing devices 110 may determine that there is a local failure. In other implementations, the vehicle's computing devices 110 may determine that there is a local failure when only one of the threshold maximum amount of diminished field of view, the threshold minimum air pressure value, or the threshold maximum engine temperature value is not met. Additionally or alternatively, the vehicle's computing devices 110 may determine that a local failure has occurred due to the receipt of the information that a loss of connection with one or more detection systems, an unreadable instruction stored in the memory, or other types of system or computing errors.

At block 404, the vehicle's computing devices 110 may determine that the vehicle should stop before completing a current trip related to transporting a passenger or good by comparing a plurality of vehicle requirements for the trip with the detected local failure, i.e., determine that a mid-trip stop is required. The plurality of vehicle requirements for the trip may be based on roadways for the trip and planned maneuvers for the vehicle 100 and may be stored at the memory 130 of the vehicle's computing devices 110 prior to the trip. A mid-trip stop may be required when the detected local failure corresponds with one of the vehicle requirements for the trip.

For example, a first sensor of the one or more detection systems may be needed for detecting at least road features in the vehicle's environment and is therefore needed for any trip. When the detected local failure includes a reduction of field of view in the first sensor that does not meet the minimum threshold, the vehicle's computing devices may determine that the vehicle should stop before completing the trip. Inflated tires may be required for any trip, therefore when any tire pressure dips below the minimum threshold, as in the example given in relation to block 402 above, a mid-trip stop may be required. Similarly, a proper engine temperature may be required for any trip, therefore when the engine temperature goes above the maximum threshold, as in the example given in relation to block 402 above, a mid-trip stop may be required.

Some urgent local failures may trigger a more immediate pullover action or other action, in which case the more immediate action may be taken automatically without further processing. The urgent local failures may include, for example, a flat tire such that the rim of the wheel comes in contact with the ground, engine failure, or the loss of connection with the first sensor.

Figure 5:
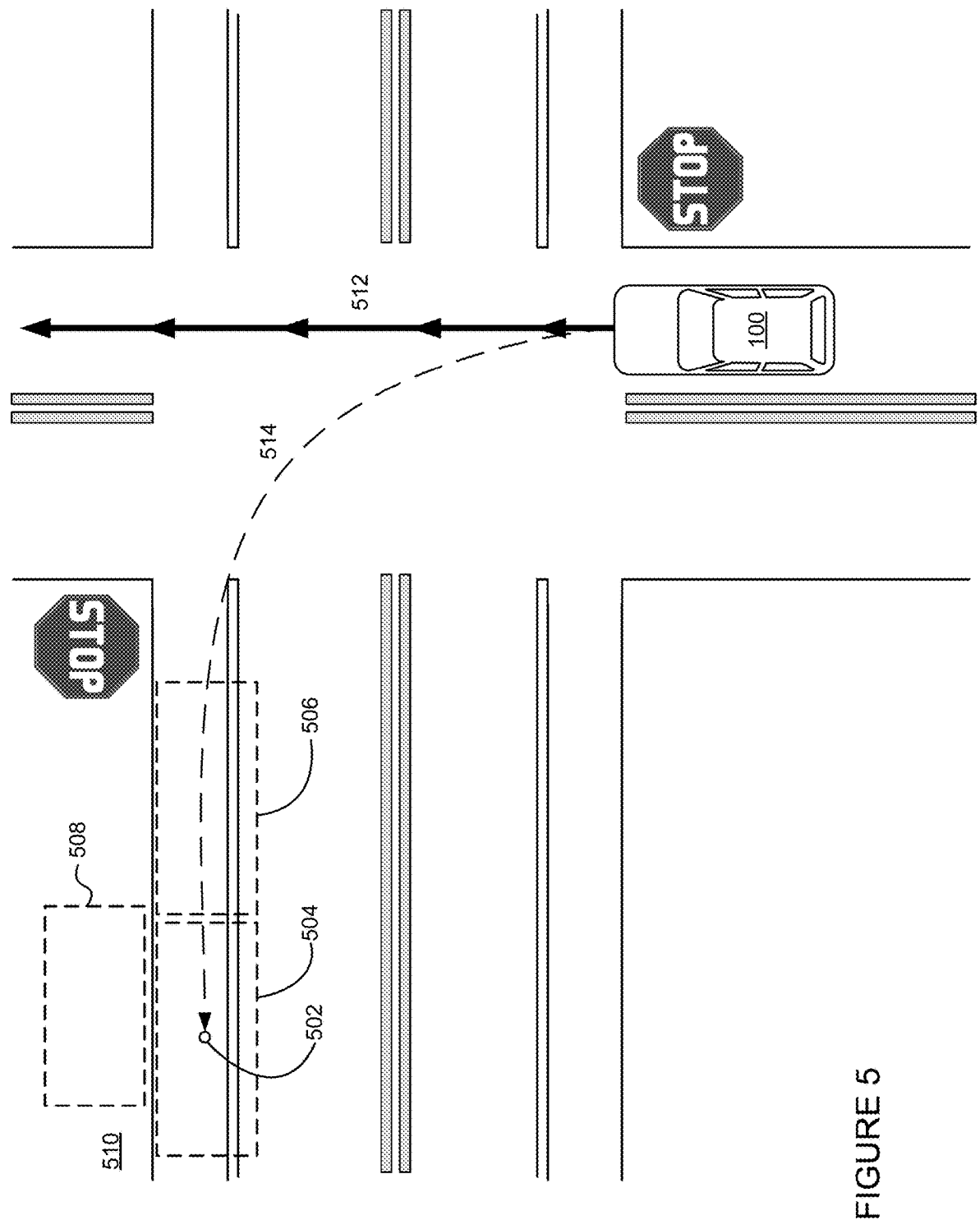
FIG. 5 is an example situational diagram in accordance with aspects of the disclosure.

At block 406, the vehicle's computing devices 110 may determine a pullover spot based on at least a first area for the vehicle to park and a second area for a second vehicle to pick up a disembarked passenger or unloaded good. For example, a location may be determined to be the pullover spot when it has a first area for the vehicle to park adjacent to or within an accessible distance from a second area where the second vehicle may park. As shown in FIG. 5, the location 502 may be determined to be the pullover spot for the vehicle 100 experiencing the local failure described above with respect to block 402 because there is a first area 504 for the vehicle 100 to park that is adjacent to a second area 506 where a second vehicle may park.

In addition, the identified areas may be determined to satisfy certain requirements. For example, the first area 504 may be required to be within a maximum distance from a current location of the vehicle 100 based on the detected local failure, reachable or accessible within a maximum amount of time based on the detected local failure, and/or at least a minimum size based on a size of the vehicle 100. The minimum size may be at least the same area as an area of the vehicle 100, or the footprint of the vehicle 100.

The maximum distance from the current location or the maximum amount of time for travelling from the current location may be determined based on the detected local failure. For example, when the local failure is due to the a reduction in a field of view of the first sensor, the maximum distance or the maximum amount of time may be determined based on what roadways the vehicle may travel on using the first sensor with the diminished field of view or may be a pre-set distance or amount of time. For another example, when the local failure is due to the reduction of tire pressure, the maximum distance or the maximum amount of time may be determined as the distance or amount of time for which the vehicle 100 may travel safely on the tire on the reduced tire pressure. There may also be a pre-set distance or amount of time that is the cap amount, such as 5 miles or 5 minutes. In other examples, the maximum amount of time may be determined based on an estimated amount of time for the tire to become flat when the tire pressure is detected to be continually decreasing. A maximum distance or amount of time for when the local failure is an overly hot engine temperature may be determined in a same or similar manner as described for the reduced tire pressure. The maximum amount of time for when the local failure is an overly hot engine temperature may alternatively be determined to decrease when the engine temperature is detected to continue to increase.

In the example shown in FIG. 5, a maximum distance based on the reduced tire pressure and the overly hot engine temperature may be 5 miles. In this example, the first area 504 is approximately 100 feet from the current location of the vehicle 100 and therefore satisfies the maximum distance requirement. The first area 504 also is greater than the footprint of the vehicle 100 and therefore satisfies the minimum size requirement.

When a wait time for the second vehicle is known and exceeds a maximum wait time threshold, there may be a requirement for the first area 504 to be within a maximum distance from one or more facilities, such as a restroom facility or a dining facility for a trip that includes a human passenger. The maximum distance from one or more facilities may be, for example, 0.5 miles, or other distance that a human passenger may be able to reach by walking. This facility requirement may not be taken into account for trips that do not include a human passenger.

In some examples, the first area 504 may further be required to be next to an additional area for a passenger to disembark from the vehicle or a good to be unloaded from the vehicle, such as the third area 508 shown in FIG. 5. This additional area may further be required to be a minimum size, a type of surface, such as a flat, or planar, surface, a minimum distance from a sidewalk or road shoulder, and/or a minimum or maximum distance from a road or from the second area for pickup. For example, for disembarking passengers, the additional area may be required to be within 5 feet from a sidewalk or road shoulder and within 50 feet from the second area for pickup. In the example shown in FIG. 5, the third area 508 satisfies both of these requirements, as the third area 508 is on the sidewalk 510 and is partially adjacent to the second area 506. For unloading the good, the requirements may be based on a characteristic of the good and needs for transferring the good from the vehicle to the second vehicle. For example, the minimum size for the additional area may be at least 1 square yard more than the base area of the good to allow for a human mover to access and move the good.

The second area 506 may be required to be a minimum size based on a size of the second vehicle and/or within a maximum distance from the first area 504. The size of the second vehicle may be set by default as, or determined to be, a same or similar size as the vehicle 100, or may be a different size, and the maximum distance may be, for example, 50 feet from the first area 504 or other distance that is reachable or accessible from the first area 504. In FIG. 5, the second area 506 is greater than the footprint of the vehicle 100 and within a foot from the first area 504, therefore the second area 506 satisfies the minimum size requirement and the maximum distance requirement. In some implementations, the vehicle may receive information about the second vehicle, such as the size of the vehicle, from the one or more server computing devices and may determine the second area based on the received information about the second vehicle. In other examples, the information about the second vehicle may include that there is more than one second vehicle and the sizes of each of the second vehicles.

Both the first and second areas may be required to satisfy pre-existing constraints on the vehicle. For example, when the vehicle is operating within a geo-fenced area, the first area and the second area may be required to be within the geo-fenced area. Other pre-existing constraints may include, for instance among other things, traffic laws, American with Disabilities Act requirements when applicable to a passenger, or weight constraints on the vehicle, goods, or roadways along a route.

Returning to FIG. 4, at block 408, the vehicle's computing devices 110 may operate the vehicle 100 in order to park in the pullover spot 502 and may also request pick up of the passenger or good in the vehicle 100. Operating the vehicle may include diverting from a first path 512 of the trip and navigating along a second path 514 to the pullover spot 502. Operating the vehicle may include determining the second path 514 based on the current location of the vehicle and the location of the determined pullover spot 502. The request may be transmitted to a fleet management system 210 remote from the vehicle via the network 260 or directly to the second vehicle. In addition, the request may be transmitted after the pullover spot 502 is determined and may include the location of the pullover spot 502. The request may also include the trip to be completed by the second vehicle and the second area for the second vehicle to park. When received at a fleet management system 210, the fleet management system 210 may select the second vehicle, such as vehicle 100A, from a plurality of vehicles based on a location of the second vehicle and an availability of the second vehicle. The second vehicle may further be selected based on whether the second vehicle has the vehicle requirements for the trip. For example, a vehicle may be selected as the second vehicle when the vehicle is available for the trip, has the vehicle requirements for the trip, and is relatively close to the pullover spot 502 in comparison to other available vehicles. The fleet management system may then transmit instructions to the second vehicle based on the pullover area, the second area, and the trip. The instructions may cause the second vehicle to navigate to the second area, pick up a passenger and/or good from the original vehicle, and complete the trip.

At block 410, the vehicle's computing devices 110 may then determine whether a passenger and/or good has been transferred to the second vehicle. To do so, the vehicle's computing devices 110 may receive an indication of the completed transfer from one or more computing devices of the second vehicle, the fleet management system 210, or a client device associated with the passenger or human escorting the good. In other implementations, the vehicle's computing device 110 may detect that the passenger or good is located in the second vehicle using one or more detection systems of the vehicle 100.

At block 412, after the completed transfer is determined, the vehicle's computing devices 110 may then operate the vehicle 100 to a fallback location based on the local failure. For example, the fallback location may be a maintenance depot capable of addressing the local failure, a base location, or a location within the maximum distance or reachable within the maximum amount of time where the vehicle 100 may safely park until it may be retrieved. For the given example, the vehicle 100 may be operated to a maintenance depot that is equipped to address at least the reduced tire pressure and/or the hot engine temperature. In another example where the vehicle 100 is unable to be operated, a mobile service unit, such as a third vehicle carrying personnel, machinery, and/or supplies, may also be requested to arrive at the pullover spot.

Alternatively, one or more computing devices remote from the vehicle, such as in a fleet management system 210, may be used for one or more steps described above. For instance, the vehicle's computing devices 110 may transmit the received information from the one or more detection systems or the detected local failure to the one or more remote computing devices for further processing. In this example, the vehicle may be a non-autonomous vehicle.

The features described herein may provide for a vehicle that reacts quickly and efficiently to a local failure by finding a pullover spot that is both safe for a passenger to disembark and accessible by a second vehicle. Determining a pullover spot and requesting a second vehicle may also allow for a trip to be quickly continued after it is interrupted by the local failure. In addition, the feature described also allows for the vehicle to continue the trip may when the local failure does not affect the operation of the vehicle for the trip, thereby preventing unnecessary interruption of trips.

Unless otherwise stated, the foregoing alternative examples are not mutually exclusive, but may be implemented in various combinations to achieve unique advantages. As these and other variations and combinations of the features discussed above can be utilized without departing from the subject matter defined by the claims, the foregoing description of the embodiments should be taken by way of illustration rather than by way of limitation of the subject matter defined by the claims. In addition, the provision of the examples described herein, as well as clauses phrased as "such as," "including" and the like, should not be interpreted as limiting the subject matter of the claims to the specific examples; rather, the examples are intended to illustrate only one of many possible embodiments. Further, the same reference numbers in different drawings can identify the same or similar elements.

The invention claimed is:

1. A method comprising:
   detecting, by one or more computing devices, information related to one or more systems of a first vehicle or an environment surrounding the first vehicle using one or more sensors of the first vehicle;
   determining, by the one or more computing devices, a local failure at the first vehicle based on the information from the one or more sensors;
   determining, by the one or more computing devices, that the first vehicle should pullover before completing a current trip, during which a good is transported, by comparing vehicle requirements for the current trip with the local failure;
   determining, by the one or more computing devices, a first area for the first vehicle to park having a first minimum size, wherein the first minimum size is determined based on a size of the first vehicle,
   determining, by the one or more computing devices, a second area for a second vehicle to park and pick up the good, and
   determining, by the one or more computing devices, a third area adjacent to the first area for the good to be unloaded from the first vehicle having a second minimum size, wherein the second minimum size is determined based on a size of the good;
   transmitting first instructions by the one or more computing devices, to the first vehicle, the first instructions causing the first vehicle to park in the first area;
   transmitting, by the one or more computing devices, a request for the second vehicle to park in the second area;
   determining, by the one or more computing devices, that the good has transferred from the first vehicle parked in the first area to the second vehicle parked in the second area; and
   in response to the determining that that the good has transferred from the first vehicle to the second vehicle, transmitting second instructions, by the one or more computing devices, to the first vehicle, the second instructions causing the first vehicle to travel to a fallback location based on the local failure.

2. The method of claim 1, wherein determining the local failure includes comparing the information with one or more set thresholds.

3. The method of claim 1, further comprising determining, by the one or more computing devices, the vehicle requirements based on characteristics of roadways for the current trip and planned maneuvers for the first vehicle during the current trip.

4. The method of claim 1, wherein determining the first area includes determining that the first area is within a maximum distance from a current location of the first vehicle.

5. The method of claim 1, wherein determining the first area includes determining that the first area is reachable by the first vehicle within a maximum amount of time from when the local failure is detected based on the local failure.

6. The method of claim 1, wherein the third area is within a maximum distance from a road.

7. The method of claim 1, wherein the third area is within a maximum distance from the second area.

8. The method of claim 1, wherein determining the first area includes determining that the second area has a third minimum size based on a size of the second vehicle.

9. The method of claim 1, further comprising:
   when a wait time for the second vehicle is known and exceeds a maximum wait time threshold, determining that the second area is within a maximum distance from one or more facilities for the good.

10. The method of claim 1, wherein transmitting the request for the second vehicle includes transmitting information related to the second area.

11. The method of claim 1, wherein the determining, by the one or more computing devices, that the good has transferred from the first vehicle to the second vehicle further includes receiving, by the one or more computing devices, an indication that the transfer of the good has been completed.

12. The method of claim 1, wherein the determining, by the one or more computing devices, that the good has transferred from the first vehicle to the second vehicle further includes detecting, by the one or more computing devices, that the good is located in the second vehicle.

13. The method of claim 1, wherein the second minimum size is a predetermined amount more that a base area of the good to allow for a human mover to access and move the good.

14. The method of claim 1, further comprising:
   receiving, by the one or more computing devices, information about a size of the second vehicle; and determining, by the one or more computing devices, a third minimum size of the second area based on the information about the size of the second vehicle.

15. The method of claim 14, wherein the information indicates that there is more than one second vehicle and the sizes of each of the second vehicles.

16. A first vehicle capable of operating autonomously, the first vehicle comprising:
one or more sensors configured to detect a status of one or more systems of the first vehicle or an environment surrounding the first vehicle; and
one or more computing devices configured to:
receive information from the one or more sensors;
determine a local failure at the first vehicle based on the information from the one or more sensors;
determine that the first vehicle should pullover before completing a current trip, during which a good is transported, by comparing vehicle requirements for the current trip with the local failure;
determine a first area for the first vehicle to park having a first minimum size, wherein the first minimum size is determined based on a size of the first vehicle,
determine a second area for a second vehicle to park and pick up the good, and
determine a third area adjacent to the first area for the good to be unloaded from the first vehicle having a second minimum size, wherein the second minimum size is determined based on a size of the good;
determine that the good has transferred from the first vehicle parked in the first area to the second vehicle parked in the second area; and
in response to the determination that that the good has transferred from the first vehicle to the second vehicle, operate the first vehicle to travel to a fallback location based on the local failure.

17. A method comprising:
detecting, by one or more computing devices, information related to one or more systems of a first vehicle or an environment surrounding the first vehicle using one or more sensors of the first vehicle;
determining, by the one or more computing devices, a local failure at the first vehicle based on the information from the one or more sensors;
determining, by the one or more computing devices, that the first vehicle should pullover before completing a current trip, during which a good is transported, by comparing vehicle requirements for the current trip with the local failure;
determining, by the one or more computing devices, a first area for the first vehicle to park having a first minimum size, wherein the first minimum size is determined based on a size of the first vehicle,
determining, by the one or more computing devices, a second area for a second vehicle to park and pick up the good, and
determining, by the one or more computing devices, a third area adjacent to the first area for the good to be unloaded from the first vehicle having a second minimum size, wherein the second minimum size is determined based on a size of the good;

transmitting first instructions by the one or more computing devices, to the first vehicle, the first instructions causing the first vehicle to park in the first area;
transmitting, by the one or more computing devices, a request for the second vehicle to park in the second area;
receiving, by one or more computing devices of an autonomous driving computing system of the first vehicle, information from one or more computing devices of the second vehicle, the information indicating that the good has transferred from the first vehicle to the second vehicle; and
in response to the one or more computing devices of the autonomous driving computing system of the first vehicle receiving the information from the one or more computing devices of the second vehicle, autonomously operating the first vehicle, by the one or more computing devices of the autonomous driving computing system of the first vehicle, to travel to a fallback location based on the local failure.

18. The method of claim 17, wherein the information received by the one or more computing devices of the autonomous driving computing system of the first vehicle indicates that the transfer of the good has been completed.

19. The method of claim 17, wherein the information received by the one or more computing devices of the autonomous driving computing system of the first vehicle indicates that the good is located in the second vehicle.

20. A first vehicle capable of operating autonomously, the first vehicle comprising:
one or more sensors configured to detect a status of one or more systems of the first vehicle or an environment surrounding the first vehicle; and
one or more computing devices configured to:
receive information from the one or more sensors;
determine a local failure at the first vehicle based on the information from the one or more sensors;
determine that the first vehicle should pullover before completing a current trip, during which a good is transported, by comparing vehicle requirements for the trip with the local failure;
determine a first area for the first vehicle to park having a first minimum size, wherein the first minimum size is determined based on a size of the first vehicle,
determine a second area for a second vehicle to park and pick up the good, and
determine a third area adjacent to the first area for the good to be unloaded from the first vehicle having a second minimum size, wherein the second minimum size is determined based on a size of the good;
receive information from one or more computing devices of the second vehicle, the information indicating that the good has transferred from the first vehicle parked in the first area to the second vehicle parked in the second area; and
in response to receiving the information from the one or more computing devices of the second vehicle, autonomously operate the first vehicle to travel to a fallback location based on the local failure.

* * * * *